United States Patent
Bahukhandi et al.

(10) Patent No.: US 8,817,153 B2
(45) Date of Patent: Aug. 26, 2014

(54) COLUMN PARALLEL READOUT IMAGE SENSORS WITH SHARED COLUMN ANALOG-TO-DIGITAL CONVERTER CIRCUITRY

(75) Inventors: Ashirwad Bahukhandi, Milpitas, CA (US); Hai Yan, San Ramon, CA (US)

(73) Assignee: Aptina Imaging Corporation, George Town (KY)

( * ) Notice: Subject to any disclaimer, the term of this patent is extended or adjusted under 35 U.S.C. 154(b) by 51 days.

(21) Appl. No.: 13/550,573

(22) Filed: Jul. 16, 2012

(65) Prior Publication Data

US 2013/0070135 A1 Mar. 21, 2013

Related U.S. Application Data

(60) Provisional application No. 61/511,500, filed on Jul. 25, 2011.

(51) Int. Cl.
*H04N 3/14* (2006.01)
*H04N 5/335* (2011.01)

(52) U.S. Cl.
USPC .......................................... 348/308

(58) Field of Classification Search
USPC .......................... 348/302, 308, 294
See application file for complete search history.

(56) References Cited

U.S. PATENT DOCUMENTS

| | | | |
|---|---|---|---|
| 6,498,576 B1 | 12/2002 | Tian et al. | |
| 6,885,396 B1 * | 4/2005 | Panicacci et al. | 348/302 |
| 7,488,926 B2 | 2/2009 | Knee et al. | |
| 7,746,400 B2 | 6/2010 | Mo | |
| 7,864,237 B2 * | 1/2011 | Muramatsu | 348/302 |
| 8,115,844 B2 | 2/2012 | Hashimoto et al. | |
| 2006/0050162 A1 | 3/2006 | Nakamura | |
| 2006/0227228 A1 * | 10/2006 | Nam | 348/272 |
| 2009/0051801 A1 | 2/2009 | Mishina et al. | |
| 2010/0208114 A1 | 8/2010 | Kwon et al. | |
| 2011/0069200 A1 | 3/2011 | Oh et al. | |

* cited by examiner

*Primary Examiner* — Gevell Selby
(74) *Attorney, Agent, or Firm* — Treyz Law Group; Michael H. Lyons

(57) ABSTRACT

Electronic devices may include image sensors having image sensor pixels arranged in rows and columns. Pixels arranged along a column may be coupled to a common column line. Two or more column lines may by coupled to a shared analog-to-digital converter circuit. The shared analog to digital converter circuit may sample and hold reset-level or image-level voltages presented on the column line. The shared analog to digital converter circuits may pre-amplify and convert the voltages to digital signals. The shared analog-to-digital converter may simultaneously sample pixel voltages for all columns in a selected row of the pixel array. The image sensor may read the converted signals out of memory for an active row in the pixel array while simultaneously sampling and holding the voltages for the next row of the pixel array.

20 Claims, 12 Drawing Sheets

US 8,817,153 B2

COLUMN PARALLEL READOUT IMAGE SENSORS WITH SHARED COLUMN ANALOG-TO-DIGITAL CONVERTER CIRCUITRY

This application claims the benefit of provisional patent application No. 61/511,500, filed Jul. 25, 2011, which is hereby incorporated by reference herein in its entirety.

BACKGROUND

This invention relates generally to imaging devices, and more particularly, to imaging devices with shared column circuitry.

Image sensors are commonly used in electronic devices such as cellular telephones, cameras, and computers to capture images. In a typical arrangement, an electronic device with an image sensor is provided with an array of image sensor pixels arranged in pixel rows and columns. Column sensing circuitry is typically coupled to each pixel column for reading out image signals from the image pixels.

One type of conventional image sensor features a single analog-to-digital (ADC) circuit that is connected to each column line in an image pixel array. The column ADC circuit processes signals provided from image sensor pixels in a selected row one column at a time (i.e., the ADC circuit samples and converts signals provided on a first column before sampling and converting signals provided on a second column in the image pixel array). Performing serial readout in this way requires a significant amount of time, especially for high resolution image pixel arrays, as each image pixel in a row must wait for the image pixel in a previous column to be read out.

In an effort to enhance column readout performance, column parallel readout image sensors have been developed. A typical column parallel readout image sensor includes one ADC circuit per column, allowing each column in the image pixel array to be sampled and converted simultaneously. These ADC circuit blocks are a major contributor to physical column height in an image sensor, and are typically the deciding factor for die size. Having one ADC circuit per column can also result in a substantial amount of power consumption.

It would therefore be desirable to be able to provide imaging devices with a reduced number of ADCs while also maintaining the improved speed of column parallel readout architecture.

DETAILED DESCRIPTION

Electronic devices such as digital cameras, computers, cellular telephones, and other electronic devices include image sensors that gather incoming light to capture an image. The image sensors may include arrays of image sensor pixels (sometimes referred to as image pixels). The image pixels may include photosensitive elements such as photodiodes that convert the incoming light into image signals. Image sensors may have any number of image pixels (e.g., hundreds or thousands or more). A typical image sensor may, for example, have hundreds of thousands or millions of image pixels (e.g., megapixels). Image sensors may include control circuitry, such as circuitry for operating the image pixels, and readout circuitry for reading out image signals corresponding to the electric charge collected using the photosensitive elements. Readout circuitry may include selectable readout circuitry coupled to each column of image pixels. Selectable readout circuitry may include analog-to-digital converters (ADC) for converting image pixel signals into digital signals.

Figure 1:
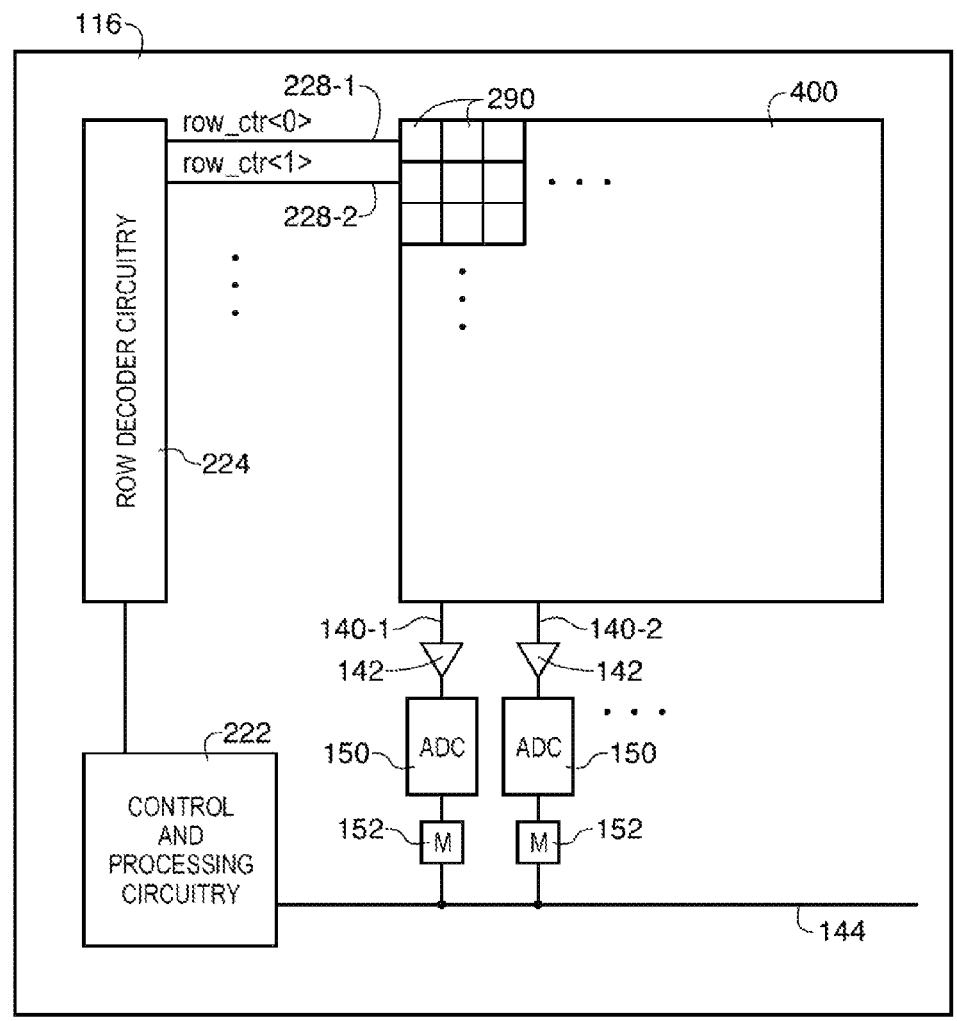
FIG. 1 is a diagram of a conventional image pixel array in an image sensor implemented using a column parallel readout architecture.

FIG. 1 is a diagram of an electronic device with an image sensor that implements column parallel readout using a single ADC circuit connected to each pixel column of an image pixel array to readout image signals. Image sensor 116 includes image sensor pixel array 400 containing image sensor pixels 290 and control and processing circuitry 222. Control circuitry 222 is coupled to row decoder circuitry 224 and global data path 144. Row decoder circuitry 224 receives row addresses from control circuitry 222 and supplies corresponding row control signals row_ctr such as reset, row-select, transfer, and other row control signals to image pixels 290 over control paths 228. Image pixels 290 in each column of image pixel array 400 are connected to a corresponding column line 140 (e.g., image pixels 290 in a first column are connected to column readout line 140-1, whereas image pixels 290 in a second column are connected to column line 140-2, etc.). Column lines 140 are used for reading out image signals from image pixels 290 and for supplying bias signals (e.g., bias currents or bias voltages) to image pixels 290. During image pixel readout operations, a pixel row in array 400 is selected using row decoder circuitry 224 and image data associated with image pixels 290 in that pixel row can be read out along column lines 140. Each column line 140 includes column circuitry such as column amplifiers 142, ADC circuit 150, and memory circuit 152.

For imager sensors with a large number of image sensor pixels, implementing an ADC circuit 150 that is connected to each column line 140 results in substantial power consumption. In addition, utilizing a large number of ADC circuits 150 contributes heavily to the physical column size, making it difficult to manufacture small image sensors 116. It may therefore be desirable to provide image sensors with reduced column circuitry complexity.

Figure 2:
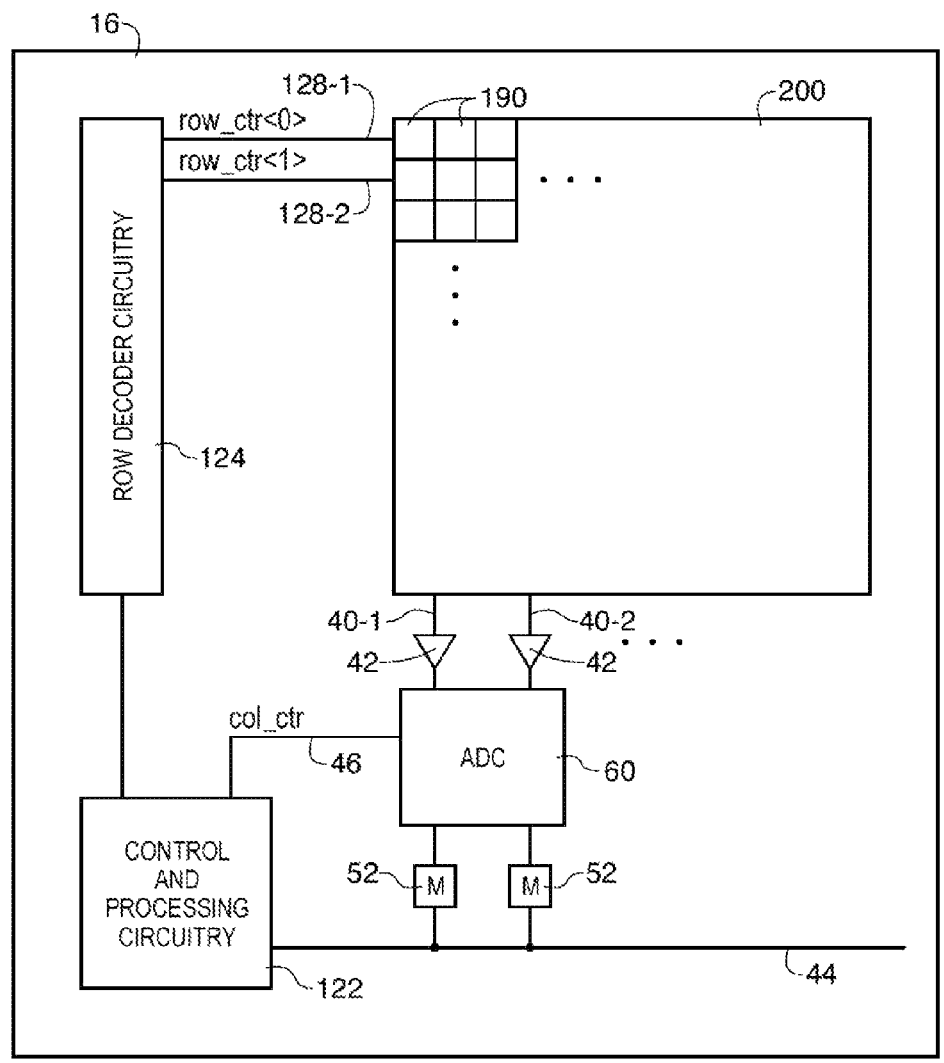
FIG. 2 is a diagram of an illustrative image pixel array in an image sensor with column parallel readout architecture having shared analog-to-digital converting (ADC) circuits in accordance with an embodiment of the present invention.

FIG. 2 shows a diagram of an electronic device that implements a shared ADC circuit coupled to two adjacent image pixel columns to perform readout of image pixel data in accordance with an embodiment of the present invention. Image sensor 16 may include image pixel array 200 containing image pixels 190 and control and processing circuitry 122. Control circuitry 122 may be coupled to row decoder circuitry 124, column control path 46, and global data path 44. Row decoder circuitry 124 may receive row addresses from control circuitry 122 and supply corresponding row control signals row_ctr such as reset, row-select, transfer, and other row control signals to image pixels 190 over control paths 128 (e.g., row decoder circuitry 124 may provide signal row_ctr<0> to a first row of image pixels in image pixel array 200 via row control line 128-1, may provide signal row_ctr<1> to a second row of image pixels in image pixel array 200 via row control line 128-2, etc.). One or more conductive lines such as column lines 40 may be coupled to each column of image pixels 190 in image pixel array 200 (e.g., image pixels in a first column of image pixel array 200 may be coupled to a first column line 40-1, image pixels in a second column of image pixel array 200 may be coupled to a second column line 40-2, etc.). Column lines 40 may be used for reading out image signals from image pixels 190 and for supplying bias signals (e.g., bias currents or bias voltages) to image pixels 190. During image pixel readout operations, a pixel row in image pixel array 200 may be selected using row decoder circuitry 124 and image data associated with image pixels 190 of that pixel row may be read out along column lines 40.

Each column line 40 may include column circuitry such as column amplifiers 42 and memory circuits 52. Adjacent column lines 40 may be coupled to a single shared ADC circuit 60 for digital conversion of each column of image pixels 190 in image pixel array 200 before output to memory circuits 52. For example, each shared ADC circuit 60 in image sensor 16 may be coupled to one column and an adjacent column of image pixel array 200 via column lines 40.

Shared ADC circuit 60 of FIG. 2 is merely illustrative. If desired, shared ADC circuit 60 may be connected to any number of column lines 40. In this way, shared ADC 60 may provide analog-to-digital conversion for any number and arrangement of pixel columns in image pixel array 200.

Figure 3:
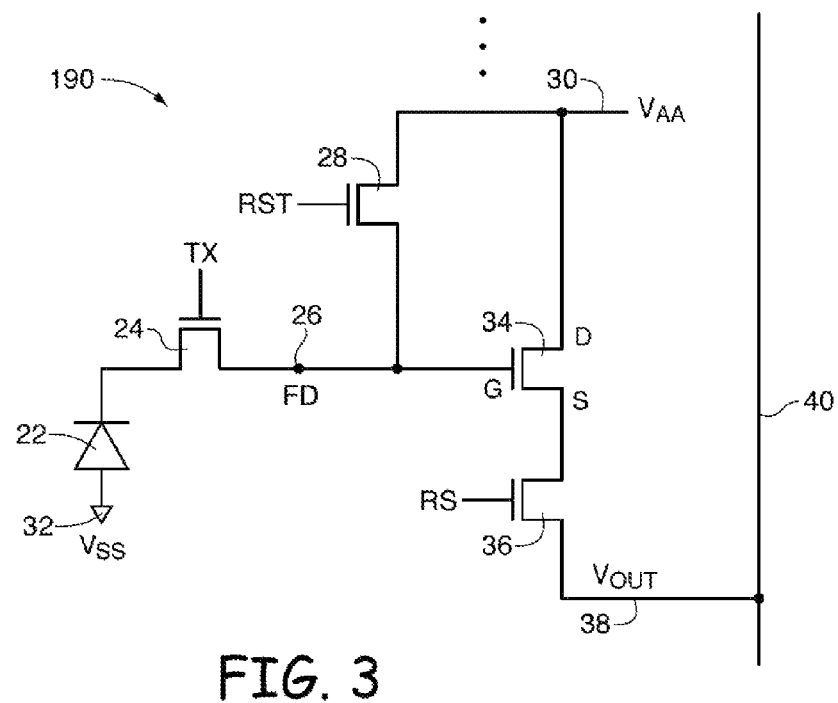
FIG. 3 is a circuit diagram of an illustrative image sensor pixel in accordance with an embodiment of the present invention.

FIG. 3 is a circuit diagram of an illustrative image sensor pixel 190. As shown in FIG. 3, image pixel 190 may include a photosensitive element such as photodiode 22. A positive power supply voltage (e.g., voltage Vaa or another reset-level voltage) may be supplied at positive power supply terminal 30. A ground power supply voltage (e.g., Vss) may be supplied at ground terminal 32. Incoming light may be collected by a photosensitive element such as photodiode 22 after passing through a color filter structure. Photodiode 22 converts the light to electrical charge.

Before an image is acquired, reset control signal RST may be asserted. This turns on reset transistor 28 and resets charge storage node 26 (also referred to as floating diffusion FD) to Vaa or another reset-level voltage. The reset control signal RST may then be deasserted to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26. Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. The signal associated with the stored charge on node 26 is conveyed to row select transistor 36 by source-follower transistor 34.

When it is desired to read out the value of the stored charge (i.e., the value of the stored charge that is represented by the signal at the source S of transistor 34), row select control signal RS may be asserted. When signal RS is asserted, transistor 36 turns on and a corresponding signal Vout that is representative of the magnitude of the charge on charge storage node 26 (e.g., a reset-level or an image-level from photodiode 22) is produced on output path 38. In a typical configuration, there are numerous rows and columns of image pixels such as image pixel 190 in image pixel array 200. When row select control signal RS is asserted in a given row, a path such as column line 40 may be used to route signal Vout from that image pixel to readout circuitry such as shared ADC circuit 60. Reset-levels and image-levels may be sampled, held, and converted for each image pixel 190 to allow for noise compensation.

Figure 4:
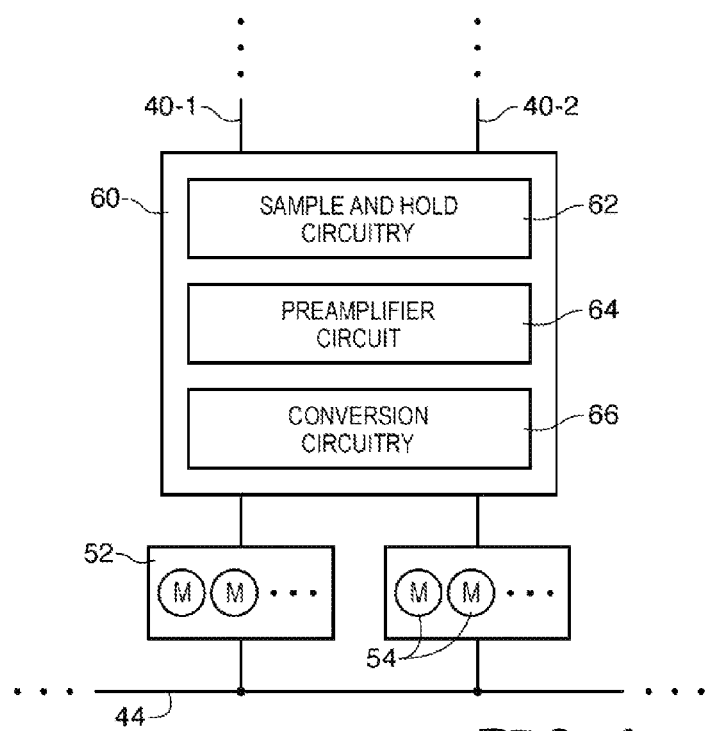
FIG. 4 is a block diagram of an illustrative shared ADC circuit and associated memory circuits in accordance with an embodiment of the present invention.

As shown in FIG. 4, shared ADC circuit 60 may be fed by two column lines 40 (e.g., adjacent column lines 40-1 and 40-2). Shared ADC circuit 60 may include sample and hold circuitry 60 for sampling and holding reset-level or image-level charges from image pixels 190 in the associated columns of a selected row in image pixel array 200. Shared ADC circuit 60 may also include an amplifying circuit such as a preamplifier circuit 64 for further amplifying potentially small column signals prior to digital conversion. Shared ADC circuit 60 may also include conversion circuitry 66 for converting the sampled, held, and pre-amplified image pixel signals to digital signals that are stored in memory circuits 52 for readout to control and processing circuitry 122, via global data path 44. The shared ADC circuits 60 coupled to all pairs of columns in image pixel array 200 may perform column sampling and conversion simultaneously.

Converted digital signals for a current, selected row of image pixels may be temporarily stored in memory circuits 52 while image signals output from a subsequent row of image pixels in image pixel array 200 are sampled and held in sample and hold circuitry 62. Signals latched in memory circuits 52 may be read out to control circuitry 122 to allow for the converted signals corresponding to the next row of image pixel array 200 to be stored in memory circuits 52 when activated by control circuitry 122 (FIG. 2). Memory circuit 52 may comprise a number of memory elements 54. Memory elements 54 may include volatile memory elements (e.g., static random-access memory cells) or nonvolatile memory elements (e.g., fuses, antifuses, electrically-programmable read-only memory elements, etc.). There may be one memory element 54 for each digital bit converted by shared ADC circuit 60.

Shared ADC circuit 60 and memory circuits 52 of FIG. 4 are merely illustrative. If desired, shared ADC circuit 60 may be coupled to any number of column lines 40 attached to columns of image pixel array 200. Shared ADC circuit 60 may employ sample and hold circuitry 62, preamplifier circuit 64, and conversion circuitry 66 to convert signals from any number of column lines 40 before being passed on to their respective memory circuits 52.

Figure 5:
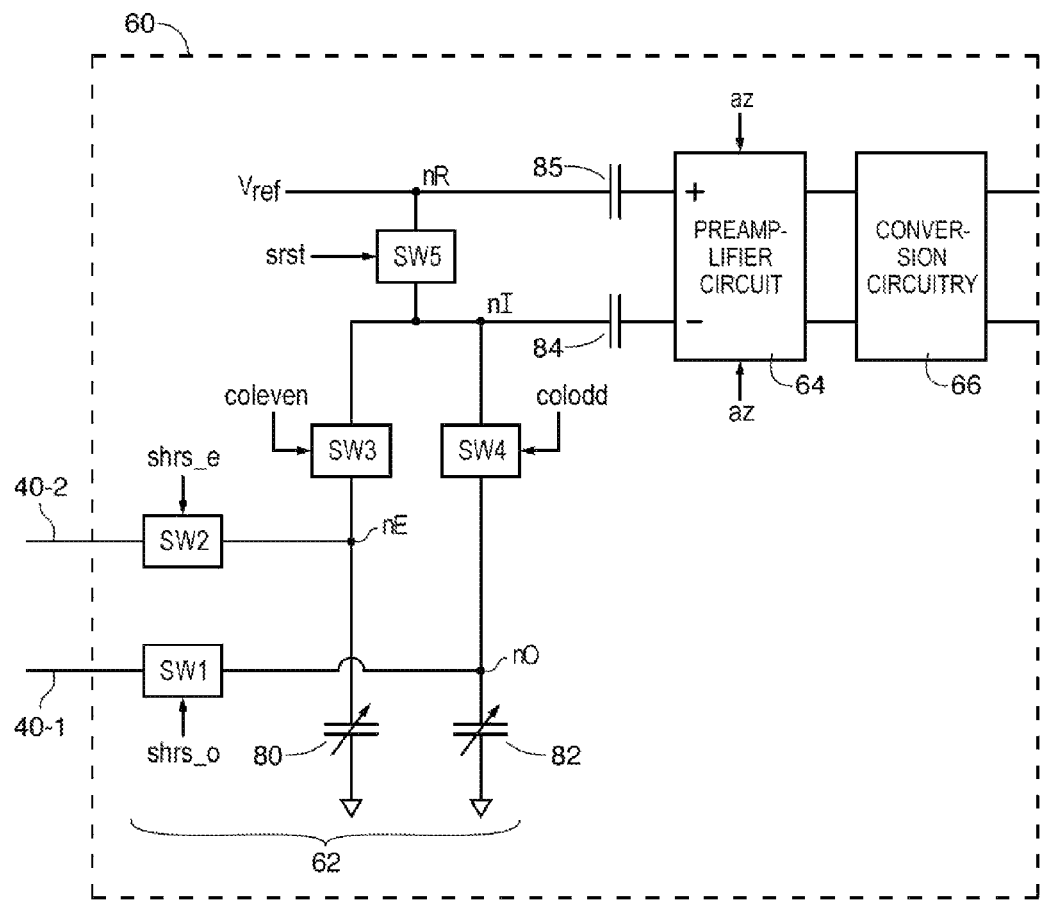
FIG. 5 is a circuit diagram of an illustrative shared ADC circuit in accordance with an embodiment of the present invention.

Image pixel array 200 (see, FIG. 2) may include columns that are grouped into adjacent pairs of columns. A first column in an adjacent pair of columns may be referred to as an "odd" column, whereas a second column in an adjacent pair of columns may be referred to as an "even" column. In the example of FIG. 5, column line 40-1 may be referred to as an odd column, whereas column 40-2 may be referred to as an even column. This is merely a way of referring to each pixel column in a pair of pixel columns, and the corresponding column lines.

FIG. 5 shows a diagram that may be used for implementing shared ADC circuit 60. As shown in FIG. 5, shared ADC circuit 60 may include sample and hold circuitry 62 that includes an even column capacitor 80, an odd column capacitor 82, and switches SW1-SW4. Shared ADC circuit 60 may also include a switch SW5, coupling capacitors 84 and 85, reference voltage source Vref, a preamplifier circuit 64, and conversion circuitry 66. Capacitors 80 and 82 may be tunable capacitors and may be adjusted to exhibit different capacitance values during various operational phases of ADC circuit 60.

Even column capacitor 80 may be coupled between an even column sampling node nE and ground. Even column sampling node nE may be coupled to column line 40-2 via switch SW2. Column line 40-2 may be coupled to an even column in a pair of pixel columns of image pixel array 200. Odd column capacitor 82 may be coupled between an odd column sampling node nO and ground. Odd column sampling node nO may be coupled to column line 40-1 via switch SW1. Column line 40-1 may be coupled to an odd column in a pair of pixel columns of image pixel array 200.

A preamplifier circuit 64 may have a first (positive) input terminal and a second (negative) input terminal. The second preamplifier input terminal may be coupled to intermediate node nI through coupling capacitor 84. Intermediate node nI may be coupled to even column sampling node nE via switch SW3 and to odd column sampling node nO via switch SW4. The first preamplifier input terminal may be coupled to reference node nR through coupling capacitor 85. A reference signal Vref may provided from a reference voltage generator. Reference node nR may be coupled to intermediate node nI via switch SW5. Preamplifier circuit 64 may be followed by conversion circuitry 66.

Charge from an even numbered column of a selected row in image pixel array 200 may be passed through the corresponding column line 40-2 and stored in even column capacitor 80 of the corresponding shared ADC circuit 60. Charge from an odd numbered column of the active row of image pixel array 200 may be passed through the corresponding column line 40-1 and stored in odd column capacitor 82 of the corresponding shared ADC circuit 60. Even column capacitor 80 and odd column capacitor 82 may also be implemented in per column control logic for conversion circuitry 66 during a signal conversion process. The shared ADC circuits 60 corresponding to all pairs of columns in image pixel array 200 may be configured to perform signal sampling and conversion in parallel.

Figure 6A:
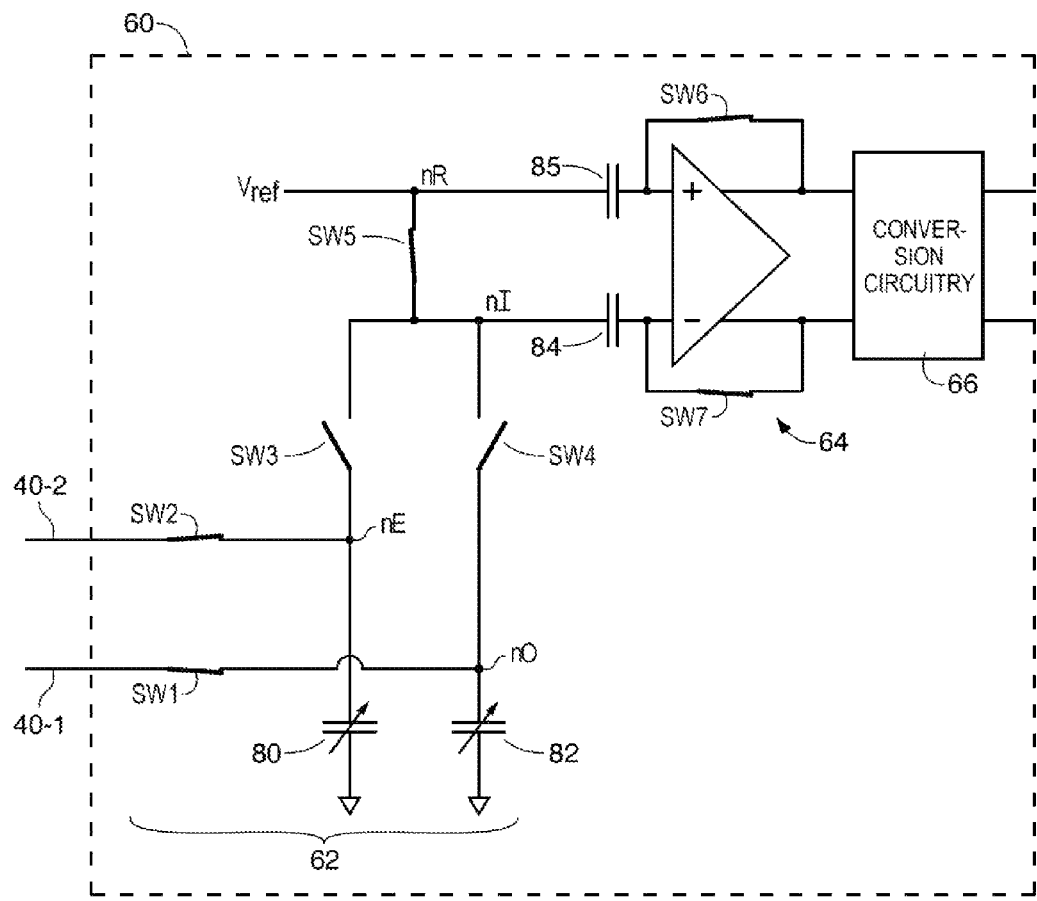
FIGS. 6A-6D are diagrams showing different operating states for an illustrative shared ADC circuit in accordance with an embodiment of the present invention.

FIGS. 6A-6D show diagrams of an illustrative shared ADC circuit as signals are sampled from the image pixel array 200 and converted to its digital equivalent. In FIG. 6A, only switches SW1, SW2, SW5, SW6, and SW7 are turned on prior to sampling an image pixel 190. Switches SW1 and SW2 may be turned on during an ADC reset phase of shared ADC circuit 60. Turning on switch SW5 may allow Vref to initialize the bottom plate of coupling capacitor 85 and coupling capacitor 84, which couple the voltage from the sampled output of even column capacitor 80 and odd column capacitor 82 to the inputs of preamplifier circuit 64. Switches SW6 and SW7 may short preamplifier circuit 64 to compensate for any amplifier offset prior to digital conversion.

Figure 6B:
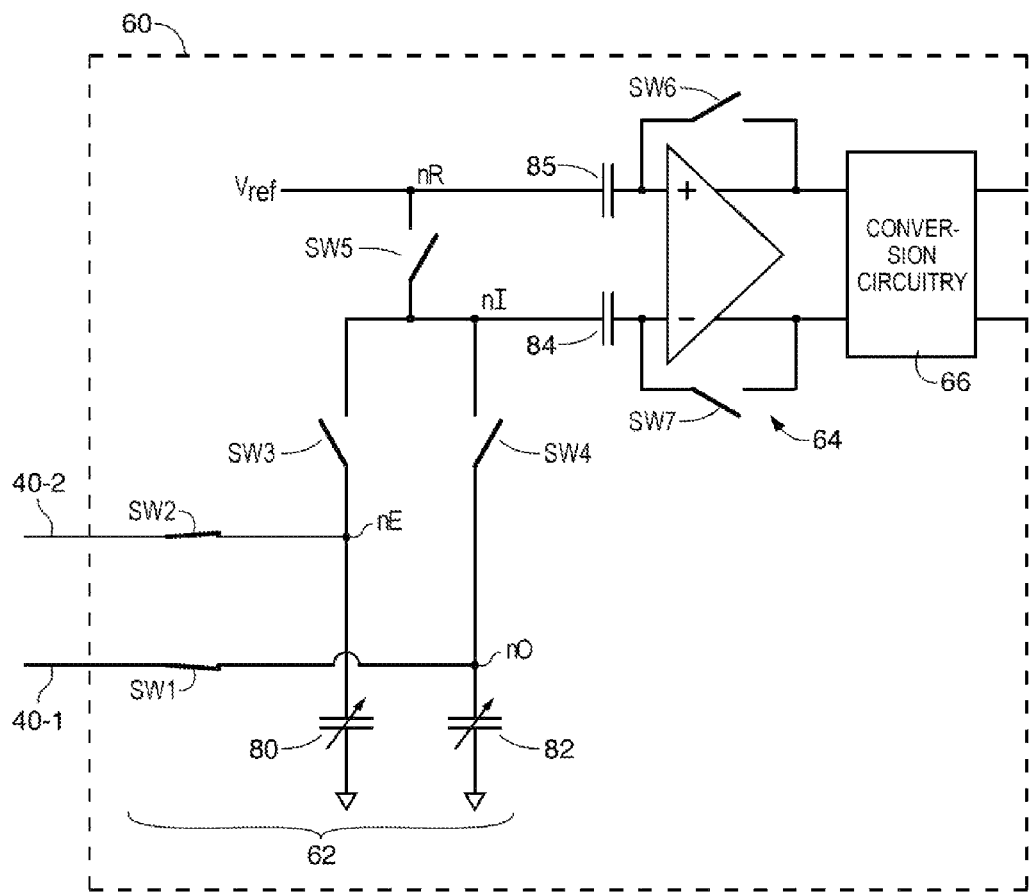

FIG. 6B shows a diagram of an illustrative shared ADC circuit 60 with only switches SW1 and SW2 turned on during a sampling phase of the reset-level or image-level voltages from an image pixel 190. Reset-level or image-level voltages may be presented on output path 38 of image pixel 190 (FIG. 3). During reset-level and image-level sampling phases, switches SW1 and SW2 may allow reset-levels or image-levels to flow from output path 38 in an image pixel 190 of an odd column in image pixel array 200 to odd column capacitor 82, via column line 40-1. Reset-levels or image-levels may then be stored on odd column capacitor 82.

Similarly, reset-levels or image-levels from an image pixel 190 may flow from an even numbered column of image pixel array 200 to even column capacitor 80 via column line 40-2. Reset-levels or image-levels may then be stored on even column capacitor 80. Even column capacitor 80 and odd column capacitor 82 allow reset-level or image-level outputs from the image pixels 190 of image pixel array 200 to be sampled from adjacent columns simultaneously and held prior to conversion in the sample and hold circuitry 62 of shared ADC circuit 60.

Figure 6C:
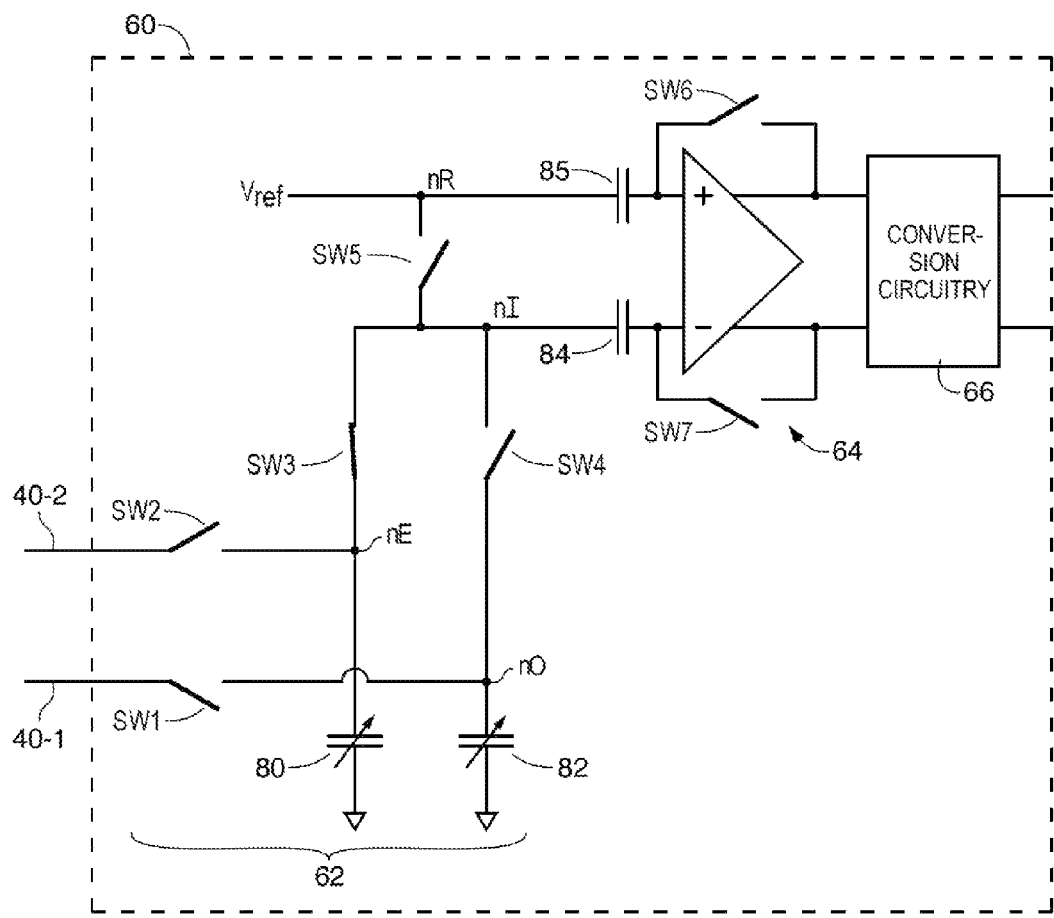

Conversion circuitry 66 may perform analog-to-digital conversion for held signals from only one of the corresponding even or odd column. FIG. 6C shows a diagram of an illustrative shared ADC circuit 60 with only switch SW3 turned on, as during a reset-level or image-level even column conversion phase. During reset-level or image-level even column conversion phase, switch SW3 may be turned on while switch SW4 is inactive to allow only the sampled signal, held in even column capacitor 80 during the sample and hold phase (FIG. 6B), to flow to preamplifier circuit 64 and conversion circuitry 66 for conversion to a digital signal.

Figure 6D:
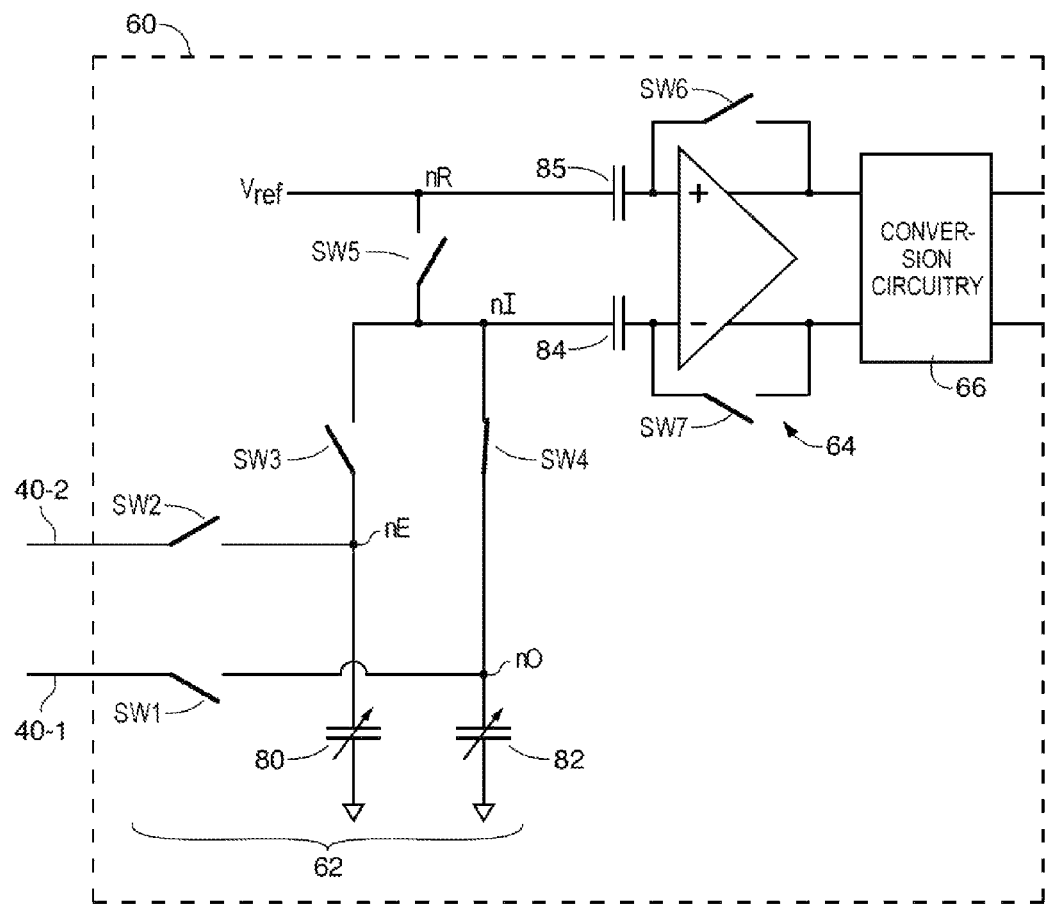

FIG. 6D shows a diagram of an illustrative shared ADC circuit 60 with only switch SW4 turned on, as during a reset-level or image-level odd column conversion phase. During reset-level or image-level odd column conversion phase, switch SW4 may be turned on while switch SW3 is inactive to allow only the sampled signal, held in odd column capacitor 82 during the sample and hold phase, (FIG. 6B) to flow to preamplifier circuit 64 and conversion circuitry 66 for conversion to a digital signal.

During odd column conversion phase, the reset-level or image-level stored in odd column capacitor 82 is coupled to preamplifier 64 for digital conversion. During even column conversion phase, the reset-level or image-level stored in even column capacitor 80 is coupled to preamplifier 64 for digital conversion. Odd column conversion phase may occur prior to even column conversion phase. Alternatively, even column conversion phase may occur prior to odd column conversion phase. This process may occur simultaneously in the shared ADC circuits 60 associated with all other pairs of columns in a selected row of image pixel array 200.

Shared ADC circuit 60 of FIG. 5 and FIG. 6A-6B is merely illustrative. If desired, shared ADC circuit 60 may be coupled to any number of column lines 40 to store charge in corresponding even column capacitors 80 or odd column capacitors 82. Shared ADC circuit 60 may implement a switch SW3 coupled to each even column capacitor 80 and a switch SW4 coupled to each odd column capacitor 82 that is implemented. Odd column capacitors 82 and even column capacitors 80 may be sequentially coupled to preamplifier circuitry 64 as illustrated in FIG. 6A-6D by turning switches SW3 and SW4 on or off. In this way, any number of pixel columns in column array 200 may share an ADC circuit 60 to convert and readout signals.

Figure 7:
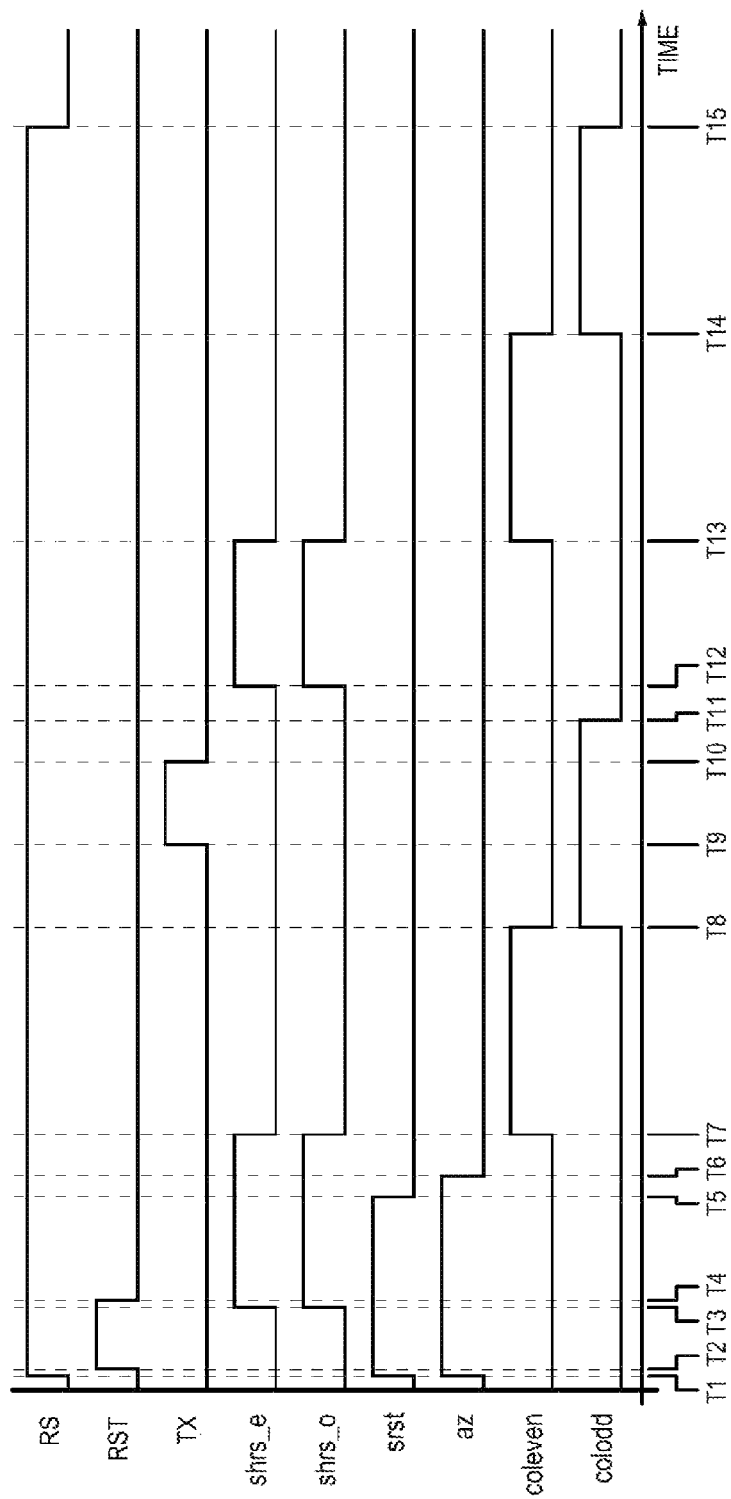
FIG. 7 is a timing diagram illustrating column readout associated with operating shared ADC circuits of the type shown in FIG. 5 in accordance with an embodiment of the present invention.

FIG. 7 is a timing diagram that illustrates the operation of ADC 60 of the type described in FIGS. 5 and 6. Row decoder circuitry 124 may supply control signals row_ctr through control paths 128 to selectively enable desired image pixels 190 (FIG. 2). Control signals row_ctr may include row select control signal RS, pixel reset control signal RST, and transfer gate control signal TX. Control and processing circuitry 122 may supply column control signals col_ctr to shared ADC circuitry 60 via column control path 46. Column control signals col_ctr may include sample-hold control signals shrs_e and shrs_o, sample reset control signal srst, auto-zero control signal az, even column control signal coleven, odd column control signal colodd, and other suitable control signals.

Row select control signal RS may be supplied to row select transistor 36 of image pixels 190 in image pixel array 200, as shown in FIG. 3. At time T1, row select control signal RS may be asserted to turn on row select transistors 36 associated with image pixels in a corresponding row. When the row select control signal RS is asserted, signals may be read out from the selected pixels.

Pixel reset control signal RST may be supplied to transistor 28 of image pixels 190 in image pixel array 200. At time T2, pixel reset control signal RST may be asserted to turn on transistor 28 of image pixel 190, transferring a reset-level voltage supplied by Vaa to output path 38 while row select transistor 36 is active (FIG. 3), thus allowing shared ADC circuit 60 to sample a reset-level. Pixel reset control signal RST may be deasserted at time T4 to turn off transistor 28 of image pixels 190. Alternatively, pixel reset control signal RST may be deasserted at time T3.

Sample reset control signal srst may be supplied to switch SW5, and auto-zero control signal az may be supplied to switches SW6 and SW7 (FIGS. 5 and 6A-6D). At time T1, sample reset control signal srst and auto-zero control signal az may be asserted to turn on switches SW5, SW6, and SW7 during the ADC reset phase as seen in FIG. 6A. Alternatively, pixel reset control signal RST may be asserted at time T1 and row select control signal RS, sample reset control signal srst, and auto-zero control signal az may be asserted at time T2.

Sample-hold control signals shrs_o and shrs_e may control switches SW1 and SW2, respectively. At time T3, sample-hold control signals shrshs_e and shrshs_o may be asserted to turn on switches SW1 and SW2 during the ADC reset phase. Alternatively, if pixel reset control signal RST is deasserted at time T3, sample-hold control signals shrshs_e and shrshs_o may be asserted at time T4.

At the end of ADC reset phase, sample reset control signal srst and auto-zero control signal az may be deasserted at times T5 and T6, respectively, to turn off switches SW5, SW6, and SW7. Switches SW1 and SW2 may remain on after switches SW6 and SW7 are turned off. After ADC reset phase, switch SW1 may allow reset-level voltage from image pixels 190 located in an odd column of image pixel array 200 to be sampled and stored in odd column capacitor 82 during a reset-level sample and hold phase. Turning on switch SW2 may allow the reset-level voltage from image pixels 190 located in an even column of image pixel array 200 to be sampled and stored in even column capacitor 80 during reset-level sample and hold phase. At time T7, sample-hold control signals shrs_o and shrs_e may be deasserted to turn off switches SW1 and SW2, ending the reset-level sample and hold phase. Between times T3 and T7, even column capacitor 80 and odd column capacitor 82 may be adjusted to exhibit first capacitances. The first capacitances may be chosen to better allow for sampling and storing reset-level signals from image pixels 190 in image pixel array 200. Alternatively, sample reset control signal srst may be deasserted at time T6 or T7, auto-zero control signal az may be deasserted at time T5 or T7, and sample-hold control signals shrshs_e and shrshs_o may be deasserted at time T5 or T6.

Even column control signal coleven may control switch SW3. At time T7, after control signals shrshs_e, shrshs_o, az, and srst are deasserted, even column control signal coleven may be asserted to turn on switch SW3 as shown in FIG. 6C, during the reset-level even column conversion phase. Turning on switch SW3 may allow reset-level voltage stored in even column capacitor 80 during the reset-level sample and hold phase to flow to preamplifier circuit 64 and conversion circuitry 66 for conversion to a digital signal. At time T8, even column control signal coleven may be deasserted to turn off switch SW3, ending the reset-level even column conversion phase.

Odd column control signal colodd may be supplied to switch SW4. At time T8, odd column control signal colodd may be asserted to turn on switch SW4 as shown in FIG. 6D, during reset-level odd column conversion phase. Turning on switch SW4 may allow the reset-level voltage stored in odd column capacitor 82 during the reset-level sample and hold phase to flow to preamplifier circuit 64 and conversion circuitry 66 for conversion to a digital signal. At time T11, odd column control signal colodd may be deasserted to turn off switch SW4, ending the reset-level odd column conversion phase.

Odd column control signal colodd may be asserted prior to asserting even column control signal coleven. Alternatively, even column control signal coleven may be asserted prior to asserting odd column control signal colodd (i.e., reset-level odd column conversion phase may occur prior to reset-level even column conversion phase, or reset-level even column conversion phase may occur prior to reset-level odd column conversion phase). This may allow conversion circuitry 66 to convert charge stored in one of odd column capacitor 82 or even column capacitor 80 at a time, after simultaneously sampling both odd and even columns of image pixel array 200 during reset-level sample and hold phase. Between times T7 and T11, even column capacitor 80 and odd column capacitor 82 may be adjusted to exhibit second capacitances that are different than the first capacitances. The second capacitances may be chosen to better allow for conversion of the stored reset-level voltage Vaa by conversion circuitry 66.

Transfer gate control signal TX may be supplied to transistor 24 of image pixel 190 (FIG. 3). At time T9, transfer gate control signal TX may be asserted to turn on transistor 24 of image pixel 190. Turning on transistor 24 of image pixel 190 may transfer collected charge generated by photodiode 22 in response to incoming light to floating diffusion region FD. The amount of charge transferred to floating diffusion region can then be converted to an image level voltage to output path 38 while row select transistor 36 is active. Transfer gate control signal TX may be asserted at time T9 and deasserted at time T10 before odd column control colodd is deasserted at time T11. In this way, charge may be transferred in image pixels 190 before the reset-level conversion phase in shared ADC circuit 60 is finished. Alternatively, transfer gate control signal TX may be asserted at any time after T7 and deasserted at any time before T13.

At time T12, sample-hold control signals shrs_e and shrs_o may be reasserted to turn on switches SW2 and SW1, respectively. Turning on switch SW1 may allow the image-level voltage from pixels 190 in an odd column of image pixel array 200 to be sampled and stored on odd column capacitor 82 during an image-level sample and hold phase. Turning on switch SW2 may allow the image-level voltage from pixels 190 in an even column of image pixel array 200 to be sampled and stored on even column capacitor 80 during an image-level sample and hold phase. At time T13, sample-hold control signals shrs_o and shrs_e may be deasserted to turn off switches SW1 and SW2, ending the image-level sample and hold phase. Between times T12 and T13, even column capacitor 80 and odd column capacitor 82 may be adjusted to exhibit third capacitances. The third capacitances may be chosen to better allow for sampling and storing image-level signals from image pixels 190 in image pixel array 200. The third capacitances may be the same as the first capacitances.

At time T13, even column control signal coleven may be reasserted to turn on switch SW3. Turning on switch SW3 may allow the image-level voltage stored in even column capacitor 80 during the image-level sample and hold phase to flow to preamplifier circuit 64 and conversion circuitry 66 for conversion to a digital signal. At time T14, even column control signal coleven may be deasserted to turn off switch SW3, ending the image-level even column conversion phase.

At time T14, odd column control signal colodd may be reasserted to turn on switch SW4. Turning on switch SW4 may allow the image-level voltage stored in odd column capacitor 82 during the image-level sample and hold phase to flow to preamplifier circuit 64 and conversion circuitry 66 for conversion to a digital signal. At time T15, odd column control signal colodd may be deasserted to turn off switch SW4, ending the image-level odd column conversion phase. Row select control signal RS may be deasserted at time T15 or any other time after T13 and may remain deasserted until all other rows of image pixel array 200 are selected and read out (i.e., at least until the next read-out cycle of image pixel array 200).

Odd column control signal colodd may be asserted prior to asserting even column control signal coleven. Alternatively, even column control signal coleven may be asserted prior to asserting odd column control signal colodd (i.e., image-level odd column conversion phase may occur prior to image-level even column conversion phase, or image-level even column conversion phase may occur prior to image-level odd column conversion phase). This may allow conversion circuitry 66 to convert charge stored in one of odd column capacitor 82 or even column capacitor 80 at a time, after simultaneously sampling both odd and even columns of image pixel array 200 during an image-level sample and hold phase. Between times T13 and T15, even column capacitor 80 and odd column capacitor 82 may be adjusted to exhibit fourth capacitances that are different than the third capacitances. The fourth capacitances may be chosen to better allow for conversion of the stored image-level voltage by conversion circuitry 66. The fourth capacitances may be the same as the second capacitances. This process may occur simultaneously in the shared ADC circuits 60 associated with all other pairs of columns in a selected row of column array 200. This process may also be repeated for each row of image pixels 190 in image pixel array 200.

The control signals as shown in FIG. 7 are merely illustrative. In other suitable arrangements, the control signals may be asserted in a different order, as long as signals from even and odd pixels can be simultaneously sampled, where the even pixel signals are processed during one conversion phase, and where the odd pixel signals are processed during another conversion phase. If desired, shared ADC circuit 60 may include any number of even column capacitors 80 and odd column capacitors 82. Shared ADC circuit 60 may be coupled to any number of column lines 40 to store charge in corresponding even column capacitors 80 or odd column capacitors 82. Shared ADC circuit 60 may implement a switch SW3 coupled to each even column capacitor 80, and a switch SW4 coupled to each odd column capacitor 82 that is implemented. Odd column capacitors 82 and even column capacitors 80 may be sequentially coupled to preamplifier circuitry 64, as illustrated in FIG. 6A-6D, by turning switches SW3 and SW4 on or off using the corresponding number of even and odd column control signals coleven and colodd. In this way, any number of pixel columns in column array 200 may share an ADC circuit 60 to convert and readout signals.

Figure 9:
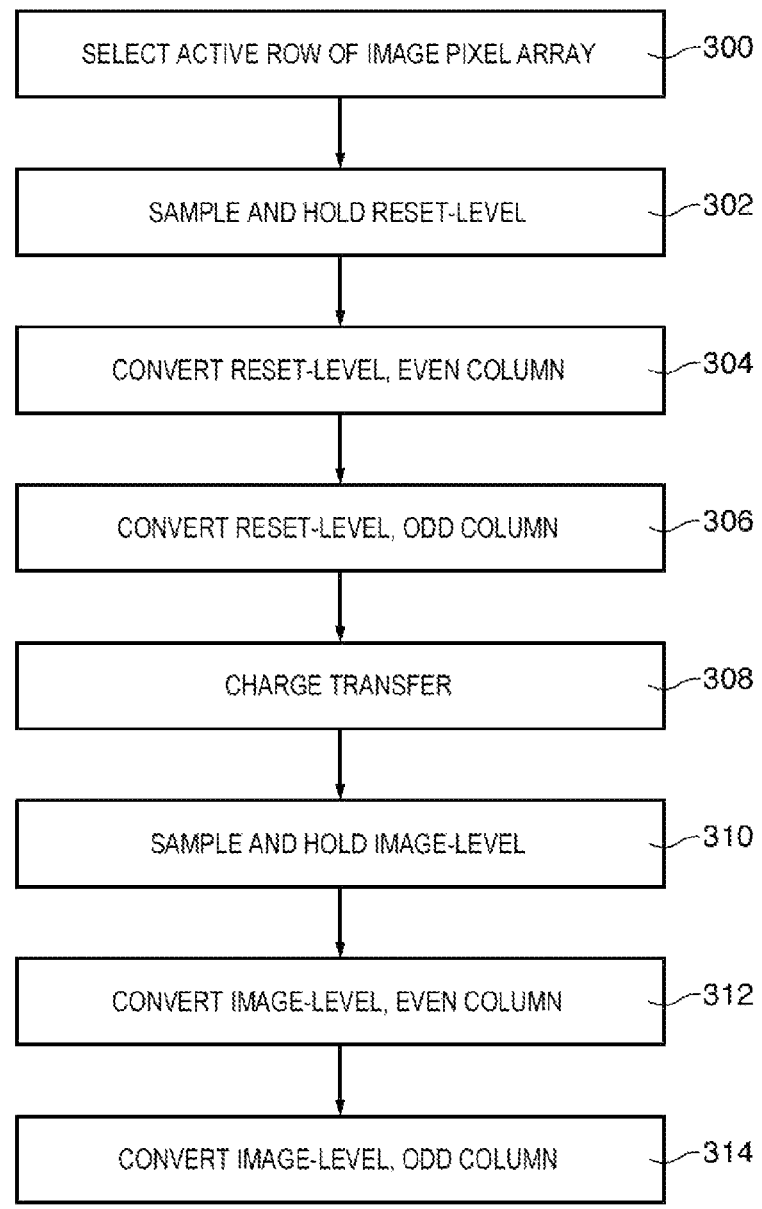
FIG. 9 is a flow chart of illustrative steps for performing column readout using a shared ADC circuit in accordance with an embodiment of the present invention.

Illustrative steps that may be used in operating a device with an image sensor 60 with parallel column readout, wherein two columns utilize a shared ADC circuit, are shown in FIG. 9.

At step 300, row select control signal RS may be asserted to row select transistor 36 (FIG. 3) at time T1 (FIG. 7) to select the active row of image pixel array 200. The subsequent steps may act simultaneously on the image pixels 190 in all of the pairs of columns in the active row of image pixel array 200.

At step 302, shared ADC circuitry 60 may be reset by turning on switches SW5, SW6, and SW7 during ADC reset phase by asserting sample reset control signal srst to turn on switch SW5 at time T1, and by asserting auto-zero control signal az to turn on switches SW6 and SW7 at time T2 (FIG. 6A,7). This may allow preamplifier circuit 64 to compensate for any preamplifier offset. Pixel reset control signal RST may be asserted at time T2 to turn on transistor 28 in image pixel 190, allowing a reset-level to form at output path 38 (FIG. 3). Sample reset control signal srst may be deasserted at time T5 to turn off switch S5. Auto-zero control signal az may be deasserted at times T6 to turn off switches SW6 and SW7.

Sample-hold control signals shrs_e and shrs_o may then be asserted at time T3 to turn on switches SW1 and SW2 during the reset-level sample and hold phase. The reset-level may be sampled from output path 38 of an image pixel 190 in an even column of a column pair in image pixel array 200, to be held in even column capacitor 80 (via column line 40-2). Simultaneously, reset-level may be sampled from an image pixel in an odd column of a column pair in image pixel array 200, to be held in odd column capacitor 80.

At step 304, switches SW1 and SW2 may be turned off by deasserting sample-hold control signals shrs_e and shrs_o at time T7. Switch SW3 may subsequently be turned on at time T7 by asserting even column control signal coleven during the reset-level even column conversion phase, allowing the sampled reset-level signal stored in even column capacitor 80 to travel to preamplifier circuit 64 and conversion circuitry 66. The converted signal is then stored in a corresponding memory circuit 52 for readout.

At step 306, odd column control signal colodd may be deasserted at time T8 to turn off switch SW3, and switch SW4 may be turned on by asserting odd column control signal colodd, during the reset-level odd column conversion phase. Turning on switch SW4 may allow the sampled reset-level signal stored in odd column capacitor 80 to flow to preamplifier circuit 64 and conversion circuitry 66. The converted signal is then stored in a corresponding memory circuit 52 for readout. The reset-level converted signals stored in memory circuits 52 during steps 304 and 306 may be readout by control and processing circuitry 122.

At step 308, transfer gate control signal TX may be asserted to turn on transistor 24 at time T9, allowing charge generated by photodiode 22 to form at output path 38 with an image-level voltage.

At step 310, sample-hold control signals shrs_e and shrs_o may be asserted at time T12 to turn on switches SW1 and SW2 during the image-level sample and hold phase. The image-level may be sampled from output path 38 of an image pixel 190 in an even column of a column pair in image pixel array 200, to be held in even column capacitor 80 (via column line 40-2). Simultaneously, the image-level may be sampled from an image pixel in an odd column of a column pair in image pixel array 200, to be held in odd column capacitor 82. The reset-level converted signals stored in memory circuits 52 during steps 304 and 306 may be readout by control and processing circuitry 122.

At step 312, switches SW1 and SW2 may be turned off by deasserting sample-hold control signals shrs_e and shrs_o at time T13. As shown in FIG. 6C, Switch SW3 may subsequently be turned on by asserting even column control signal coleven in the image-level even column conversion phase. Turning on switch SW3 may allow the sampled image-level signal stored in even column capacitor 80 to flow to preamplifier circuit 64 and conversion circuitry 66. The converted signal is then stored in a corresponding memory circuit 52 for readout.

At step 314, even column control signal coleven may be deasserted at time T14 to turn off switch SW3, and switch SW4 may be turned on by asserting odd column control signal colodd during the image-level odd column conversion phase. Turning on switch SW4 may allow the sampled image-level stored in odd column capacitor 82 to flow to preamplifier circuit 64 and conversion circuitry 66. Odd column control signal colodd may be deasserted at time T15. The converted signal is then stored in a corresponding memory circuit 52 for readout. The image-level converted signals stored in memory circuits 52 may be readout by control and processing circuitry 122. Row select control signal RS may also be deasserted at time T15 or any other time after T13. Steps 300-314 may be repeated to read out the other pixel rows in image pixel array 200.

Steps 300-314 of FIG. 9 are merely illustrative. If desired, shared ADC circuit 60 may be coupled to any number of pixel columns in image pixel array 200 via column lines 40. Additional steps may be added after reset-level conversion steps 304 and 306 to allow for conversion of signals stored in any number of even column capacitors 80 and odd column capacitors 82 in shared ADC circuit 60. This may allow shared ADC circuit 60 to convert signals from any number of column lines 40 corresponding to the same number of pixel columns in image pixel array 200. Similar steps may be added after the image signal-level conversion steps 312 and 314.

Figure 8:
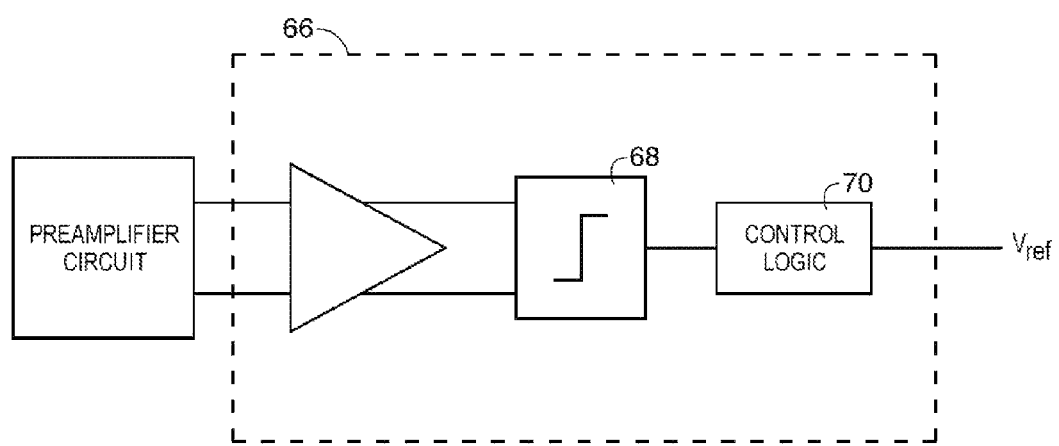
FIG. 8 is a diagram of illustrative conversion circuitry in accordance with an embodiment of the present invention.

FIG. 8 shows illustrative conversion circuitry that may be used to compare and convert analog image pixel signals to digital signals. Conversion circuitry 66 of shared ADC circuit 60 may include comparator 68 (sometimes referred to as a comparator circuit) and control logic 70. Comparator circuit 68 may be shared between adjacent columns and may serve to convert signals that are simultaneously sampled from the adjacent columns. Comparator circuit 68 may be coupled to even column capacitor 80 through switch SW3 and odd column capacitor 82 through switch SW4. Comparator circuit 68 may receive the sampled signals stored on even column capacitor 80 through switch SW3 while switch SW4 is inactive during the even column conversion phase. Comparator circuit 68 may receive the sampled signals stored on odd column capacitor 80 through switch SW4 while switch SW3 is inactive during the odd column conversion phase.

Control logic 70 may be fed by a reference voltage Vref that is driven by a global buffer. Conversion circuitry 66 may be implemented using a successive-approximation ADC architecture, a single-ramp ADC architecture, a dual-slope ADC architecture, a hybrid of these architectures, or other data conversion configurations. For example, conversion circuit 66 may convert to a digital signal by implementing a successive-approximation approach. Control logic 70 may include even column capacitor 80 and odd column capacitor 82 that are additionally used to sample and hold reset-levels and image signal-levels from image pixels 190. Even column capacitor 80 and odd column capacitor 82 may first sample and hold charge from column lines 40 during steps 302 or 310 as shown in FIG. 9, and then be implemented in conversion as an element of conversion circuitry 66 during steps 306, 308, 312, and 314.

Figure 10:
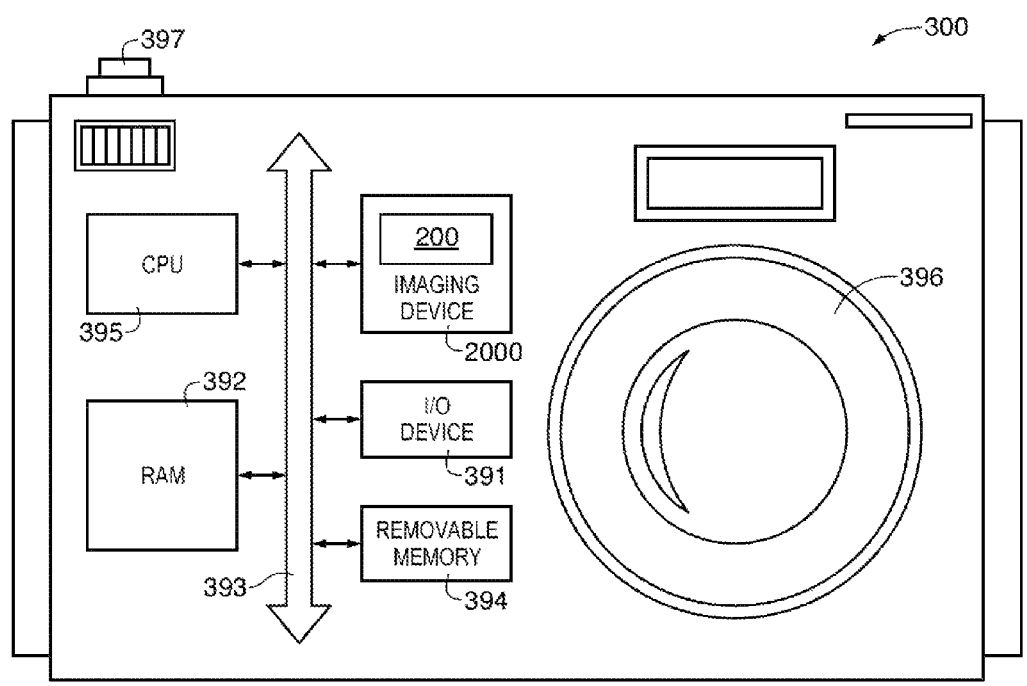
FIG. 10 is a block diagram of a processor system employing the image sensor of FIG. 2 in accordance with an embodiment of the present invention.

FIG. 10 shows in simplified form a typical processor system 300, such as a digital camera, which includes an imaging device 2000 (e.g., an imaging device 2000 such as image sensor 16 of FIG. 2 employing column parallel readout architecture having shared analog-to-digital converting (ADC) circuits as described above). The processor system 300 is exemplary of a system having digital circuits that could include imaging device 2000. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300, for example a digital still or video camera system, generally includes a lens 396 for focusing an image on pixel array 200 when a shutter release button 397 is pressed, central processing unit (CPU) 395, such as a microprocessor which controls camera and one or more image flow functions, which communicates with one or more input/output (I/O) devices 391 over a bus 393. Imaging device 2000 also communicates with the CPU 395 over bus 393. The system 300 also includes random access memory (RAM) 392 and can include removable memory 394, such as flash memory, which also communicates with CPU 395 over the bus 393. Imaging device 2000 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating an image sensor with parallel column readout architecture with shared ADC circuitry. The shared ADC circuitry may include multiple ADC circuits each of which is coupled to multiple column lines in an image pixel array. The use of shared ADC circuitry may allow for digital conversion of image signals with a reduced number of ADC circuits. Steps for operating a shared ADC circuit may include, with a data converting circuit, sampling first image signals from a first image pixel via a first output line while simultaneously sampling second image signals from a second image pixel via a second output line, and converting the first and second sampled image signals during first and second respective phases. The data converting circuit may include first and second capacitors used for receiving the first and second image signals, and a comparator coupled to the first and second capacitors via first and second respective switches, used for converting the first and second sampled image signals during the first and second phases. The first and second capacitors may be adjusted to exhibit first capacitances while sampling image signals from the image pixels, and second capacitances different than the first capacitances while converting the sampled image signals. The data converting circuit may also include a coupling capacitor coupled to the first and second switches and the comparator, and an amplifying circuit coupled to the coupling capacitor and the comparator, used for amplifying the sampled first and second image signals prior to converting the first and second image signals during the first and second phases.

The shared ADC circuitry may be implemented in a system that also includes a central processing unit, memory, input-output circuitry, and an imaging device that further includes a pixel array, a lens for focusing light onto the pixel array, and a data converting circuit.

The image signals in image sensor pixels located along a first row of the pixel array may be sampled and held in the data converting circuit for image pixels associated with all columns in the first row simultaneously. While sampling the image pixels along the first row, the data converting circuit may convert the sampled signals from image pixels associated with all of columns along a second row of the pixel array during first and second phases.

The foregoing is merely illustrative of the principles of this invention which can be practiced in other embodiments.

What is claimed is:

1. A method of operating an image sensor having a plurality of image sensor pixels, comprising:
   with a first input of a data converting circuit, receiving first signals from a first image sensor pixel in the plurality of image sensor pixels via a first output line;
   with a second input of the data converting circuit, receiving second signals from a second image sensor pixel in the plurality of image sensor pixels via a second output line;
   with the data converting circuit, simultaneously sampling the first and second signals;
   during a first phase, converting the first sampled signals with the data converting circuit;
   during a second phase that is different than the first phase, converting the second sampled signals with the data converting circuit, wherein simultaneously sampling the first and second signals comprises:
      with a first capacitor in the data converting circuit, receiving the first signals from the first output line, and
      with a second capacitor in the data converting circuit, receiving the second signals from the second output line, wherein the data converting circuit further includes a comparator that is coupled to the first capacitor through a first switch and that is coupled to the second capacitor through a second switch;
   with the comparator, receiving the first sampled signals from the first capacitor through the first switch while the second switch is inactive; and
   with the comparator, receiving the second sampled signals from the second capacitor through the second switch while the first switch is inactive.

2. The method defined in claim 1, wherein the data converting circuit comprises an analog-to-digital converter, wherein converting the first sampled signals comprises converting the first sampled signals with the analog-to-digital converter during the first phase, and wherein converting the second sampled signals comprises converting the second sampled signals with the analog-to-digital converter during the second phase.

3. The method defined in claim 1, further comprising:
   while simultaneously sampling the first and second signals, adjusting the first and second capacitors to exhibit first capacitances; and
   during the first and second phases, adjusting the first and second capacitors to exhibit second capacitances that are different than the first capacitances.

4. The method defined in claim 1, further comprising:
   with the comparator in the data converting circuit, receiving the first sampled signals from the first capacitor during the first phase; and
   with the comparator in the data converting circuit, receiving the second sampled signals from the second capacitor during the second phase.

5. The method defined in claim 1, wherein converting the first sampled signals comprises converting the first sampled signals using the comparator in the data converting circuit during the first phase, and wherein converting the second sampled signals comprises converting the second sampled signals using the comparator in the data converting circuit during the second phase.

6. The method defined in claim 5, further comprising:
   with the comparator, receiving the first sampled signals through a coupling capacitor during the first phase and receiving the second sampled signals through the coupling capacitor during the second phase.

7. The method defined in claim 5, further comprising:
   with an amplifying circuit, receiving the first sampled signals, amplifying the first sampled signals, and providing the amplified first sampled signals to the comparator during the first phase; and
   with the amplifying circuit, receiving the second sampled signals, amplifying the second sampled signals, and providing the amplified second sampled signals to the comparator during the second phase.

8. A system, comprising:
   a central processing unit;
   memory;
   input-output circuitry; and
   an imaging device, wherein the imaging device comprises:
      a pixel array;
      a lens that focuses an image on the pixel array; and
      a data converting circuit having first and second inputs, wherein the first input of the data converting circuit receives first signals from a first image sensor pixel in the pixel array via a first output line, wherein the second input of the data converting circuit receives second signals from a second image sensor pixel in the pixel array via a second output line, wherein the data converting circuit is configured to simultaneously sample the first and second signals, wherein the data converting circuit is configured to convert the first sampled signals during a first phase, and convert the second sampled signals during a second phase that is different than the first phase, wherein the data converting circuit comprises:
         a first capacitor that samples the first signals from the first output line; and
         a second capacitor that samples the second signals from the second output line, wherein the first and second capacitors comprise first and second adjustable capacitors.

9. The system defined in claim 8, wherein the data converting circuit comprises an analog-to-digital converter.

10. The system defined in claim 8, wherein the first and second capacitors simultaneously sample the first and second signals, respectively.

11. The system defined in claim 10, wherein the first the second adjustable capacitors are adjusted to exhibit first capacitances during the simultaneous sampling of the first and second signals, and wherein the first and second adjustable capacitors are adjusted to exhibit second capacitances that are different than the first capacitances during the first and second phases.

12. The system defined in claim 10, wherein the data converting circuit further comprises a comparator that receives the first sampled signals from the first capacitor during the first phase and that receives the second sampled signals from the second capacitor during the second phase.

13. The system defined in claim 10, wherein the data converting circuit further comprises a comparator that is coupled to the first capacitor through a first switch and that is coupled to the second capacitor through a second switch, wherein the comparator receives the first sampled signals from the first capacitor through the first switch while the second switch is inactive, and wherein the comparator receives the second sampled signals from the second capacitor through the second switch while the first switch is inactive.

14. The system defined in claim 8, wherein the data converting circuit further comprises a comparator circuit, wherein the comparator circuit converts the first sampled signals during the first phase and converts the second sampled signals during the second phase.

15. The system defined in claim 14, further comprising:
an amplifying circuit that receives the first and second sampled signals, wherein the amplifying circuit amplifies the first sampled signals and provides the amplified first sampled signals to the comparator circuit during the first phase, and wherein the amplifying circuit amplifies the second sampled signals and provides the amplified second sampled signals to the comparator circuit during the second phase.

16. A method of operating an image sensor having an array of image sensor pixels arranged in rows and columns, wherein image sensor pixels arranged along a first column in the array are coupled to a first column line, and wherein image sensor pixels arranged along a second column in the array are coupled to a second column line, the method comprising:
sampling first signals from image sensor pixels in a first row of the array; and
while sampling the first signals, converting second signals that are sampled from image sensor pixels in a second row of the array, wherein converting the second sampled signals comprises:
during a first phase, converting the second signals sampled from the first column line with a data converting circuit; and
during a second phase that is different than the first phase, converting the second signals sampled from the second column line with the data converting circuit.

17. The method defined in claim 16, further comprising:
simultaneously sampling the second signals on the first and second column lines.

18. The method defined in claim 17, wherein sampling the first signals from image sensor pixels in the first row of the array comprises simultaneously sampling the first signals on the first and second column lines, and wherein simultaneously sampling the second signals comprises simultaneously sampling the second signals before sampling the first signals.

19. The method defined in claim 16, wherein the image sensor comprises first and second capacitors and comparator circuitry, wherein the first capacitor is coupled to the comparator circuitry through a first switch, wherein the second capacitor is coupled to the comparator circuitry through a second switch, and wherein converting the second signals comprises:
with the first capacitor, receiving a first set of signals from the first column line;
with the second capacitor, receiving a second set of signals from the second column line; and
with the comparator circuitry, receiving the first set of signals from the first capacitor through the first switch while the second switch is inactive.

20. The method defined in claim 19, wherein converting the second signals further comprises:
with the comparator circuitry, receiving the second set of signals from the second capacitor through the second switch while the first switch is inactive.

* * * * *